United States Patent [19]

Meiller

[11] Patent Number: 4,673,214

[45] Date of Patent: Jun. 16, 1987

[54] HEAD SUPPORT FOR A SEAT BACKREST

[75] Inventor: Hermann Meiller, Amberg, Fed. Rep. of Germany

[73] Assignee: Grammer Sitzysteme GmbH, Fed. Rep. of Germany

[21] Appl. No.: 891,155

[22] Filed: Jul. 31, 1986

[30] Foreign Application Priority Data

Aug. 28, 1985 [DE] Fed. Rep. of Germany ....... 3530687

[51] Int. Cl.$^4$ ................................................ A47C 7/36
[52] U.S. Cl. ..................................... 297/408; 297/409; 297/404; 297/410
[58] Field of Search ............... 297/408, 409, 410, 407, 297/404, 391

[56] References Cited

U.S. PATENT DOCUMENTS

| 1,257,427 | 2/1918 | Underwood | 297/407 |
| 2,586,952 | 2/1952 | Johnson et al. | 297/408 X |
| 3,012,819 | 12/1961 | Mungovan | 297/404 X |
| 3,029,107 | 4/1962 | Myers | 297/404 |
| 3,642,321 | 2/1972 | Schwarz | 297/410 |
| 4,111,483 | 9/1978 | Jaeger | 297/410 |
| 4,191,422 | 3/1980 | Inasawa et al. | 297/409 |
| 4,256,341 | 3/1981 | Goldner et al. | 297/408 X |
| 4,606,578 | 8/1986 | Yasui | 297/410 |

FOREIGN PATENT DOCUMENTS 2945060  5/1981  Fed. Rep. of Germany ...... 297/408

Primary Examiner—Francis K. Zugel
Attorney, Agent, or Firm—R. Gale Rhodes, Jr.

[57] ABSTRACT

In a head support assembly comprising a head support member carried on a mounting bar member in such a way as to be adjustable in respect of height and/or inclination thereon, the mounting bar member carries at least one annular flexible element co-operating with portions of the head support member and in frictional engagement relationship with the mounting bar member and/or the portions of the head support member.

10 Claims, 2 Drawing Figures

HEAD SUPPORT FOR A SEAT BACKREST

BACKGROUND OF THE INVENTION

The invention relates generally to a head support for mounting on the backrest portion of a seat such as a vehicle seat.

With increasing concern about safety factors in motor vehicles, recent years have seen the increased adoption of head supports or headrest assemblies which are mounted on the backrest portion of a vehicle seat, to support the head in the event of abrupt forward acceleration of the motor vehicle, for example as a result of a tail-end impact, with the consequent risk of a whiplash injury to the neck of the occupant of the seat.

Whether a head support is used in a motor vehicle or in a different context, it is often desirable to provide for adjustment of the head support, for example to provide for pivotal movement thereof, thereby to adjust the angle of inclination of the head support, or to provide for displacement of the head support in a substantially vertical direction in order to adjust the height of the head support.

SUMMARY OF THE INVENTION

An object of the present invention is to provide a head support for a seat backrest portion, which is adapted to provide for adjustment in respect of height and/or in respect of angle of inclination.

Another object of the invention is to provide a head support for a seat, which permits progressive stepless adjustment in respect of height and/or inclination.

A further object of the invention is to provide a head support arrangement for mounting to the backrest portion of a seat, which is adjustable in respect of height and/or inclination while being of a simple construction thereby to minimise production costs.

Still a further object of the present invention is to provide a head support arrangement for a seat, which permits adjustment in respect of height and/or inclination by simple means which are of light weight, thereby to minimise loadings acting on the head support arrangement due to the weight thereof.

In accordance with the present invention, in a first aspect, these and other objects are achieved by a head support for the backrest portion of a seat, comprising at least one elongate mounting member such as a rod or bar which interconnects the backrest portion of the seat and the head support carried thereon and which extends into the hollow space or cavity in the head support. To permit the head support to be pivotable about a transverse axis with respect to the elongate connecting member, for the purposes of adjustment of the angle of inclination of the head support, the elongate mounting member carries an annular flexible element which extends therearound. Disposed in the cavity in the head support are first and second wall portions which extend on respective sides of said annular flexible element on the elongate mounting member, in substantially parallel relationship to the desired plane of pivotal movement of the head support. The wall portions are spaced by a distance such that the annular flexible element is in substantial rubbing contact with the mutually facing surfaces of the wall portions. The head support can thus be pivoted relative to the elongate mounting member, against the resistance provided by the frictional engagement between the wall portions and the annular flexible element, such resistance then holding the head support in the adjusted position as required.

In a further aspect of the invention, a head support for the backrest portion of a seat comprises at least one elongate mounting member such as a rod or bar which interconnects the backrest portion of the seat and the head support and which extends into a cavity in the head support. The head support is displaceable lengthwise of the mounting member for the purposes of adjustment of the height of the head support relative to the backrest portion of the seat. Disposed on the elongate mounting member is at least one annular flexible element which is a fit on the mounting member without clearance relative thereto, being therefore a snug or tight fit. The at least one annular flexible element is fixed between first and second abutment means disposed in the cavity in the head support, whereby the mounting member is displaceable in the direction of its length, relative to the annular flexible element which is a snug fit thereon, against the frictional resistance afforded by the annular flexible element on the mounting member.

It will be seen therefore that in the constructions in accordance with the invention, the head support can be readily fixed in the respective adjusted position thereof, after adjustment either in respect of its height or in respect of its angle of inclination, by virtue of the frictional engagement between the respective annular flexible element on the mounting member and the spaced-apart wall portions, in the first aspect of the invention, or by virtue of the frictional engagement between the annular flexible element on the mounting member and the mounting member itself, in the second aspect of the invention. The frictional engagement in each case may be overcome sufficiently readily to permit the head support to be adjusted in the appropriate fashion.

A preferred feature of the invention provides that, in regard to the structure for providing adjustment of the head support in respect of the angle of inclination, provided in the cavity in the head support are first and second guide means which extend substantially transversely with respect to the direction of elongation of the elongate mounting member and at least substantially in the fore-and-aft direction relative to the seat on which the head support is mounted, the guide means thus extending generally horizontally in the position of use of the head support, in order thereby to guide the flexible annular element on the elongate mounting member upon pivotal movement of the head support, the annular flexible element being carried with clearance or play between the guide means, in the direction of elongation of the elongate mounting member. The clearance or play between the guide means disposed respectively above and below the annular flexible element on the elongate mounting member is necessary as, when the head support pivots relative to the mounting member, the guide means move in an arcuate path relative to the annular flexible element.

In another preferred feature of the construction of the first aspect of the invention, play or clearance is provided between the mounting member and the flexible element carried thereon, which is in frictional engagement with the inside surfaces of the first and second wall portions on respective sides thereof, so that that element is not in frictional engagement with the mounting member in the lengthwise direction thereof. In that case that flexible element only provides for adjustment of the head support in respect of its angle of inclination.

If the head support is to be adapted to be adjusted both in respect of angle of inclination and also in respect of height, then in the construction in accordance with the second aspect of the invention, the above-mentioned abutment means between which the annular flexible element which is a snug fit on the elongate mounting member is fixed are preferably in the form of guide means which in the position of use of the head support extend substantially horizontally, while provided between said guide means and the annular flexible element co-operating therewith are low-friction hard lining discs or plates, in order not to generate additional undefined friction upon pivotal movement of the head support, by virtue of the annular flexible element which is a snug fit around the elongate mounting member. The lining discs or plates may be for example of metal.

In a preferred embodiment of the teachings of the invention, to provide both adjustment in respect of angle of inclination and adjustment in a fore-and-aft direction, the mounting member carries two spaced-apart annular flexible elements which are each disposed between and in frictional contact with two wall portions which extend through the cavity in the head support, in substantially vertical positions and in parallel relationship to the desired plate of pivotal movement of the head support relative to the seat backrest portion on which it is mounted. In that way, not only may the head support be pivoted relative to the mounting member, by virtue of one of the annular flexible elements being displaced relative to the associated wall portions on respective sides thereof, but furthermore the head support may be shifted in the fore-and-aft direction relative to the seat on which the head support is mounted, by virtue of both the annular flexible elements being displaced relative to their respective pairs of wall portions on each side thereof.

Further objects, features and advantages of the present invention will be more clearly apparent from the following description of a preferred embodiment thereof.

DESCRIPTION OF THE PREFERRED EMBODIMENT

Figure 1:
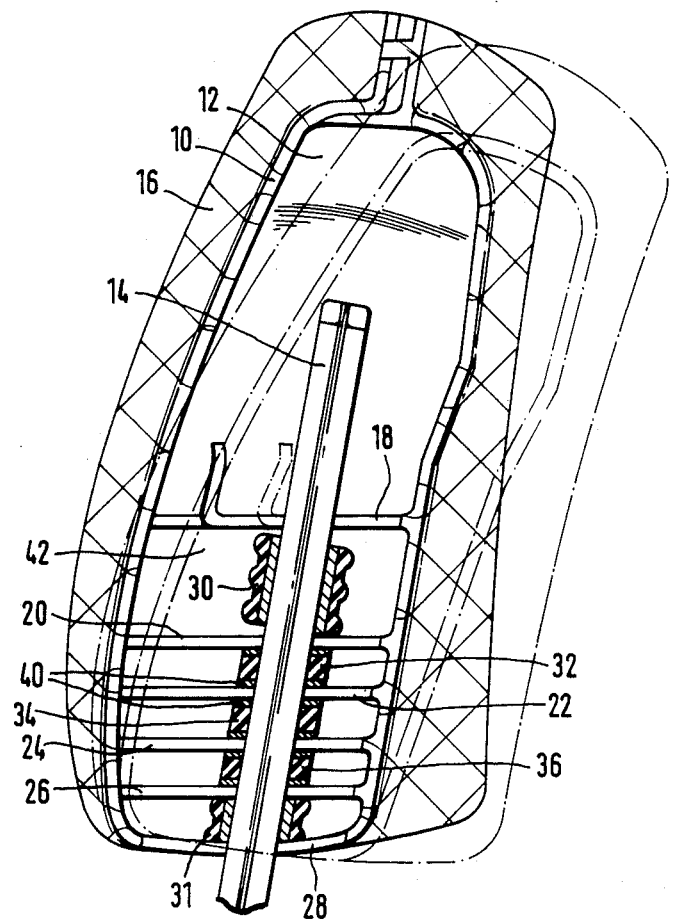
FIG. 1 is a sectional side view of a head support.

Referring to FIG. 1, shown therein is a head support arrangement in accordance with the present invention, comprising a body portion 10 which is for example of a hard plastic material adequate for the intended use of the head support. The body portion 10 thus essentially imparts the required shape to the head support. The body portion 10 has a hollow space or cavity therein, as indicated by reference numeral 12 in both FIGS. 1 and 2, while extending into the cavity 12 is an elongate mounting member 14 which is connected in a suitable fashion to a backrest portion of a seat, for example by the lower end portion thereof (not visible in the drawings) being fitted into mountings provided on the support structure of the backrest portion. Although only one elongate mounting member 14 is shown in FIGS. 1 and 2, it will be appreciated that the head support may comprise a plurality thereof.

Figure 2:
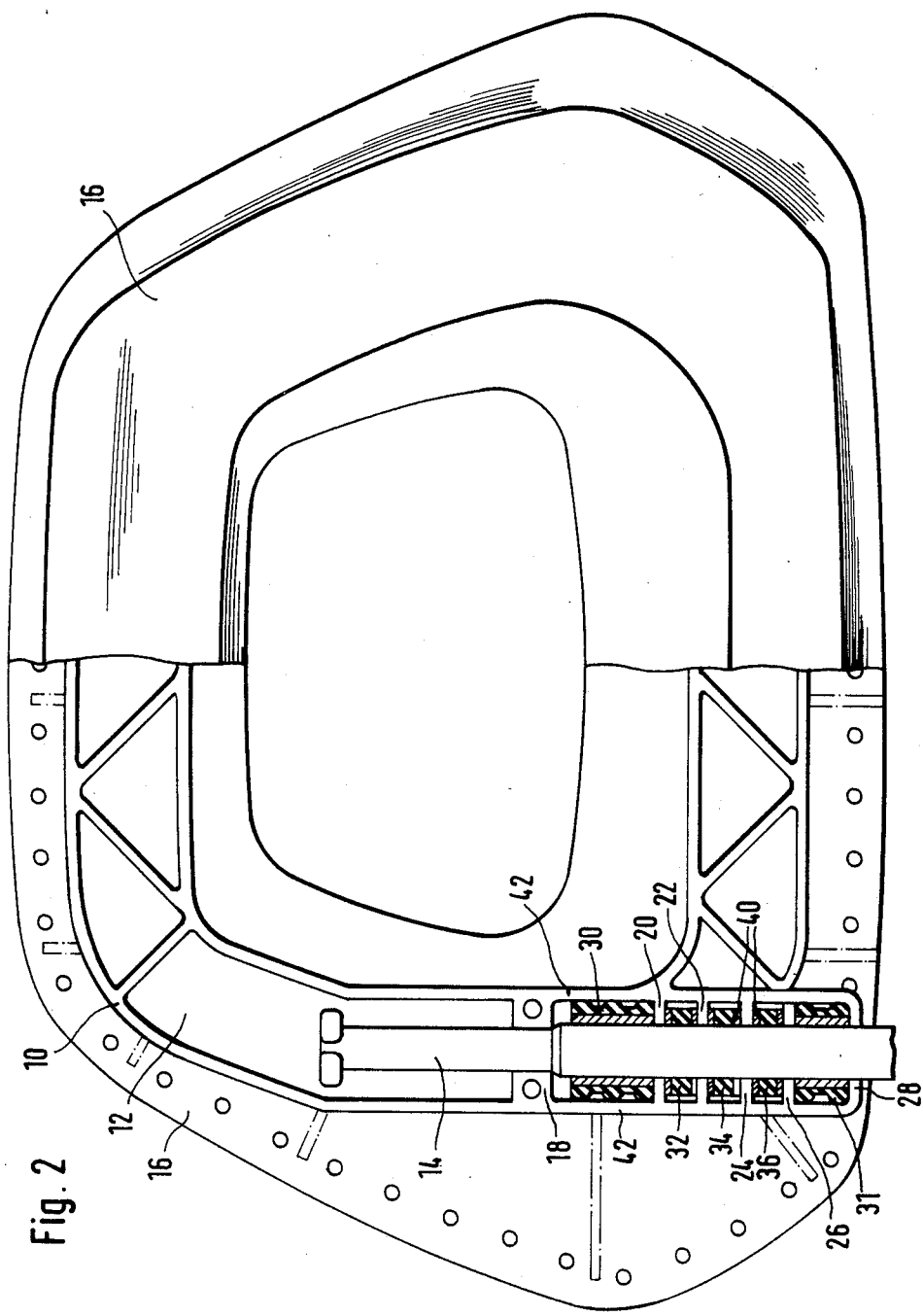
FIG. 2 is a front view in partial section of the head support shown in FIG. 1.

Reference numeral 16 in FIGS. 1 and 2 denotes a cushion or upholstery material which is disposed around the body portion 10 of the head support, in the usual fashion.

Referring now to both FIGS. 1 and 2, it will be seen therefrom that disposed in the cavity 12 of the head support is a plurality of bar or web portions 18, 20, 22, 24, 26 and 28 which in the position of use of the head support extend at least generally horizontally, as can best be seen from FIG. 1. The portions 18, 20, 22, 24, 26 and 28 also extend in at least substantially parallel relationship to each other, also as best seen in FIG. 1. Those portions from substantially horizontal guide and abutment means for a plurality of annular flexible elements as indicated at 30, 31, 32, 34 and 36 which are disposed on and thus extend around the mounting member 14 which, as mentioned, may be in the form of a rod or bar. As can be clearly seen from FIGS. 1 and 2, the flexible elements 30 and 31 are of such an internal dimension that they have clearance relative to the adjoining surface of the elongate mounting member 14, whereas the flexible elements 32, 34 and 36 extend around the mounting member 14 without clearance or play relative thereto. In other words, the elements 30 and 31 are freely slidable on the mounting member 14 in the axial direction thereof whereas the elements 32, 34 and 36 are in frictional engagement with the mounting member 14.

It will be seen that the flexible elements 32, 34 and 36 are held between the respective adjoining portions 20 and 22; 22 and 24; 24 and 26, with hard low-friction lining plates or discs 40 being disposed between each of the portions 20, 22, 24 and 26 and the respectively associated face of the flexible element 32, 34 and 36. The lining discs or plates, as indicated at 40, may comprise for example metal or other suitable material. The elements 32, 34 and 36 are thus disposed in such a way that they do not have clearance or play between the portions 20, 22, 24 and 26, in the lengthwise direction of the member 14. By virtue of the low-friction lining discs or plates 40, the flexible elements 32, 34 and 36 oppose virtually no frictional resistance to movement of the head support in a horizontal direction, that is to say from left to right or from right to left in FIG. 1, or about a transverse axis with respect to the mounting member 14, whereas, by virtue of the fact that they are a snug or fairly tight fit on the mounting member 14, they put up a considerable degree of frictional resistance to movement of the head support along the mounting member 14. The head support member comprising the body portion 10 and the cushion portion 16 can thus be displaced lengthwise of the mounting member 14, by virtue of the frictional resistance between the mounting member 14 and the elements 32, 34 and 36 being overcome by suitable force whereas when that force is removed, the head support member will remain in its adjusted position on the mounting member 14.

The situation is different in regard to the flexible elements 30 and 31 which are disposed with clearance around the mounting rod or bar 14. Those flexible elements 30 and 31 exert virtually no resistance to movement of the head support member lengthwise with respect to the mounting member 14, whereas they are operative to provide a substantial resistance to horizontal movement of the head support, that is to say in the fore-and-aft direction relative to the seat on which the head support is mounted, or a pivotal movement of the head support member about a transverse axis with respect to the mounting member 14. Such resistance produced by the elements 30 and 31 is afforded by virtue of the fact that they are disposed between and are in frictional engagement with first and second spaced-apart wall portions 42 which extend at least substantially parallel to the desired plane of pivotal movement or fore-and-aft movement of the head support member. As can be seen from FIG. 2, the wall portions 42 extend at least generally vertically in the position of use of the head support and extend between mutually oppositely disposed side walls of the body portion 10 of the head support, as can be seen from FIG. 1. It will be seen therefore that the lower part of the cavity 12 shown in FIG. 1 for example is bridged across by the web portions 18, 20, 22, 24 and 26, with a bottom web portion 28, each of those portions being disposed substantially horizontally, while the wall portions 42 provide frictional-engagement surfaces which also extend across the cavity 12 but which are substantially vertical and thus at right angles to the frictional-engagement surfaces afforded by the portions 20, 22, 24, 26 and 28.

It will be further seen more particularly from FIG. 1 that the flexible element 30 is disposed with play or clearance between the portions 18 and 20, in the lengthwise direction of the mounting member 14, thus permitting the body portion of the head support to move with a pivotal motion relative to the mounting member 14, as indicated by the dash-dotted outline in FIG. 1, in spite of the fact that the portions 18 and 20 are of a straight configuration. It will be further appreciated that such pivotal movement of the head support member is possible irrespective of the adjusted position thereof in respect of height on the mounting member 14.

It will be seen further from FIG. 2 that the portions 18, 20, 22, 24, 26 and 28 serve not just as horizontal guide and abutment means for the flexible elements 30, 31, 32, 34 and 36, but they also serve to guide the body portion 10 with respect to the mounting member 14 insofar as the mounting member 14 extends through suitable slots provided in the portions 18, 20, 22, 24, 26 and 28; the side surfaces defining such slots thus provide guide surfaces for the mounting member 14.

The flexible elements 30, 31, 32, 34 and 36 are preferably of a rubber, although they may also be of any other suitable material.

Although the illustrated construction provides for adjustment of the head support in respect of its angle of inclination, by pivotal movement about a transverse axis, adjustment in respect of height by displacement lengthwise of the mounting member 14, and adjustment in the fore-and-aft direction relative to the seat on the backrest portion of which the head support is mounted, by virtue of the head support member being displaced towards the right or towards the left in FIG. 1 relative to the mounting member 14, without however being inclined, it would be possible to reduce the number of modes of adjustment, if desired. Accordingly, if the head support is only to be pivotable about a transverse axis to provide for adjustment in respect of angle of inclination, without also providing for fore-and-aft adjustment, one of the flexible elements 30 and 31, preferably the element 31, can be eliminated. In that case, the portion 28 also does not need to be in the form of a guide means by virtue of having a slot therein.

It will be appreciated that the above-described construction has been set forth solely by way of example of the principles of the present invention, and that various modifications and alterations may be made therein without thereby departing from the spirit and scope of the invention.

What is claimed is:

1. A head support for the backrest portion of a seat, comprising at least one elongate mounting member adapted to be mounted to said backrest portion and a head support member having a cavity therein, into which said mounting member projects, wherein, for the purposes of adjustment of the angle of inclination of the head support member, at least one flexible element is disposed on said mounting member around same, and extending within said cavity in parallel relationship to the plane of said pivotal adjustment movement are first and second vertical spaced-apart wall portions with which said element is in friction engagement.

2. A head support as set forth in claim 1 and further including horizontal guide means in said cavity in said head support member and adapted to guide said element upon pivotal movement of said head support member horizontally in said plane of pivotal movement, said element being disposed with clearance in the lengthwise direction of said mounting member between said guide means.

3. A head support as set forth in claim 1 wherein clearance is provided between said mounting member and said element.

4. A head support for the backrest portion of a seat according to claim 1, wherein for the purposes of height adjustment of the head support member disposed within said cavity are at least first and second horizontal guide means adapted to guide said flexible element and between which said flexible element is disposed, whereby said head support member is adjustable lengthwise of said mounting member by displacement of said flexible element thereon against said frictional-engagement, and further including low-friction members between said horizontal guide means and said flexible element.

5. A head support as set forth in claim 4 wherein said low-friction members comprise lining plates of a hard material.

6. A head support as set forth in claim 5 wherein said material is metal.

7. A head support as set forth in claim 1 wherein for the purposes of displacement of said head support member at least substantially parallel to itself and in a horizontal direction, first and second said flexible elements are disposed on said mounting member, said first and second elements being spaced from each other in the lengthwise direction of said mounting member and each being in frictional engagement with said mutually facing surfaces of said wall portions.

8. A head support as set forth in claim 1 wherein said at least one element comprises a rubbery material.

9. A head support as set forth in claim 4 wherein said at least one element comprises a rubbery material.

10. A head support assembly for mounting to the backrest portion of a seat, including at least one elongate mounting member adapted to be mounted to the backrest portion and a head support member carried on said mounting member, said support member comprising: a body portion providing a cavity therein, said mounting member extending into said cavity; extending within said cavity, a plurality of bar portions which in the position of use of said head support assembly are disposed substantially horizontally and at a spacing from each other thereby defining at least one respective space therebetween, said bar portions having upwardly and downwardly facing surfaces and each bar portion having an opening therethrough for accommodating said mounting member; extending within said cavity, first and second wall portions which in the position of use of said support head assembly are disposed substantially vertically and at a spacing from each other, said wall portions thereby providing mutually facing spaced-apart vertical surfaces and said mounting member further extending between said vertical surfaces; disposed in said at least one space between said spaced-apart bar portions, a respective first element which is carried by said mounting member and which is in frictional engagement with said mounting member while being in at least low-friction contact with the respectively adjoining surfaces of the respective said bar portions; disposed between said mutually facing surfaces of said first and second wall portions at least one second element carried by said mounting member and having clearance from the peripheral surface of the mounting member while being in frictional engagement with said mutually facing surfaces of said first and second wall portions, displacement of said at least one first element on said mounting member against the frictional engagement therewith permitting controlled adjustment of said support member lengthwise of said mounting member and displacement of said at least one second element relative to said first and second wall portions against the frictional engagement with said mutually facing surfaces thereof permitting controlled adjustment of said support member relative to said mounting member transversely with respect thereto in a vertical plane.

* * * * *